(12) United States Patent
Kohmura

(10) Patent No.: US 7,314,204 B2
(45) Date of Patent: Jan. 1, 2008

(54) SLIDING RAIL SYSTEM

(75) Inventor: Mitsunao Kohmura, Aichi (JP)

(73) Assignee: Kabushikigaisha Imasen Denki Seisakusho, Aichi (JP)

(*) Notice: Subject to any disclaimer, the term of this patent is extended or adjusted under 35 U.S.C. 154(b) by 76 days.

(21) Appl. No.: 11/236,017

(22) Filed: Sep. 27, 2005

(65) Prior Publication Data

US 2007/0069099 A1    Mar. 29, 2007

(51) Int. Cl.
*F16M 13/00* (2006.01)

(52) U.S. Cl. ..................................... 248/430

(58) Field of Classification Search ............... 248/424, 248/429, 430; 297/344.1
See application file for complete search history.

(56) References Cited

U.S. PATENT DOCUMENTS

| | | | | |
|---|---|---|---|---|
| 5,848,775 | A * | 12/1998 | Isomura et al. | 248/430 |
| 5,961,089 | A * | 10/1999 | Soisnard | 248/430 |
| 6,089,521 | A * | 7/2000 | Tarusawa et al. | 248/430 |
| 6,113,051 | A * | 9/2000 | Moradell et al. | 248/430 |
| 6,641,104 | B2 * | 11/2003 | Flick | 248/430 |
| 6,742,753 | B2 * | 6/2004 | Klahold et al. | 248/429 |
| 6,772,985 | B2 * | 8/2004 | Lee | 248/424 |
| 7,048,244 | B2 * | 5/2006 | Hauck | 248/430 |
| 7,147,195 | B2 * | 12/2006 | Danjo et al. | 248/430 |
| 2002/0109063 | A1 * | 8/2002 | Jaudouin et al. | 248/430 |
| 2003/0085330 | A1 * | 5/2003 | Lee | 248/430 |
| 2003/0230696 | A1 * | 12/2003 | Yamada et al. | 248/424 |
| 2006/0071140 | A1 * | 4/2006 | Kim | 248/430 |

FOREIGN PATENT DOCUMENTS

| | | |
|---|---|---|
| JP | 57-55613 | 11/1974 |
| JP | 2001-158259 | 6/2001 |
| JP | 2002-154355 | 5/2002 |

* cited by examiner

*Primary Examiner*—Korie Chan
(74) *Attorney, Agent, or Firm*—Adams Evans P.A.

(57) ABSTRACT

OBJECT

An object of the present invention is to provide such a seat slide apparatus employing substantially box-like shape in cross section, which is small size, light weight and a high strength without increasing the number of component parts and weight or the like.
SOLVING MEANS There is employed such a constitution that a substantially box-like shape in cross section is formed by a base portion 11*a* and right and left vertical walls 11*b* of an upper rail 11, and a base portion 15*d* and right and left vertical walls 15*e* of a locking member 15; and further at the outer side thereof, a substantially box-like shape in cross section identical to conventional shape is formed with the upper rail 11 and the lower rail 12.

6 Claims, 6 Drawing Sheets

SLIDING RAIL SYSTEM

TECHNICAL FIELD

The present invention relates to a slide rail apparatus for adjusting and securing the position of a seat for vehicle, particular to a constitution of a slide rail apparatus capable of increasing the strength without increasing the size or the weight thereof in the slide rail apparatus with a locking mechanism disposed within a rail.

BACKGROUND ART

Conventionally, there have been proposed slide rail apparatuses such that a locking mechanism is disposed in an internal space in which an upper rail and a lower rail are fitted with each other and the size and weight of the entire constitution is reduced, and have been put into practical use (for example, apparatuses set forth in patent document 1 and patent document 2).

A slide rail apparatus 100 shown in FIG. 7 set forth in patent document 1 includes an upper rail 101, which is formed of a metal plate bent into the substantially inversed U-like shape in cross section thereof, and a lower rail 102, which is formed of a metal plate bent into substantially a U-like shape in cross section thereof. In the slide rail apparatus 100, an upper rail 101 is slidably fitted with a lower rail 102 in a state that a locking member 103 is disposed therein. The upper rail 101 has a planer base portion 101a, a pair of vertical walls 101b formed at the both sides thereof and a pair of flanges 101c in which the end faces of the vertical walls 101b are bent outward from the lower ends of the vertical walls 101b, and swollen in a L-like shape. In a substantially central area in the longitudinal direction of the vertical walls 101b and the flanges 101c, locking parts 101d for locking are formed. Also, the lower rail 102 has a planer base portion 102a, a pair of vertical walls 102b formed at the both sides thereof and flanges 102c, which are bent inward from the upper end of the vertical walls 102b. Formed between the vertical walls 102b and the flange 102c is a pair of right and left grooves 102d. Integrally formed in the longitudinal direction of the flanges 102c is a plurality of continuous locking teeth 102e.

There is employed such a constitution that the lower rail 102 and the upper rail 101 are coupled with each other in a state that the right and left flanges 101c of the upper rail 101 are inserted into the right and left grooves 102d of the lower rail 102. Further, retainers 105, which include steel balls respectively, are attached being inserted between the flanges 101c and the vertical walls 102b, thereby the upper rail 101 is allowed to slide smoothly with respect to the lower rail 102. Therefore, the slide rail apparatus 100 has a substantially box-like sectional shape having a high modulus of section, which is enclosed by the base portion 101a and the both vertical walls 101b of the upper rail 101 and the base portion 102a and the both vertical walls 102b of the lower rail 102 or the like. Thus, a reasonable shape and constitution, which is capable of achieving a high strength with a small size and light weight, is employed.

Also, in the inside formed by the upper rail 101 and the lower rail 102, which are slidably fitted with each other, a locking member 103 of a resilient material such as a spring steel plate is disposed. The locking member 103 is fixed to the base portion 101a of the upper rail 101 by a rivet 104 at a substantially central portion thereof. A locking hook portion 103a is formed integrally with one end portion of the locking member 103, and an upraised cut portion 103b with which the end portion of a handle lever 106 is latched at an appropriate distance therefrom.

In a state that the slide rail apparatus 100 is not adjusted, the locking hook portion 103a of the locking member 103 engages with an appropriate portion of the locking teeth 102e and the locking part 101d simultaneously so as to fix the relative position between the upper rail 101 and the lower rail 102. When the handle lever 106 is handled, the operation force is transmitted to the upraised cut portion 103b of the locking member 103, a portion formed with the upraised cut portion 103b and the locking hook portion 103a are integrally displaced against the resilient force of the locking member 103 itself. Then, the engagement among the locking hook portion 103a, the locking part 101d and the locking teeth 102e is released; thus the relative position between the upper rail 101 and the lower rail 102 can be adjusted.

A slide rail apparatus 200 shown in FIG. 8, which is set forth in patent document 2, has an upper rail 201 and a lower rail 202 having a constitution substantially identical to that of the slide rail apparatus 100 set forth in the above-described patent document 1. Between the upper rail 201 and the lower rail 202, a lock plate 203 is disposed, and a retainer 204 is attached being inserted therebetween. The lock plate 203 is formed of a bent metal plate, and in the central portion thereof, a substantially reversed U-like shaped portion 203a identical to the shape of the upper rail 201 is formed. In one end portion of the lock plate 203, side plates 203b and a projecting piece 203c integrally formed therewith are formed; and a locking hook portion 203d is formed in the other end portion.

The side plates 203b of the lock plate 203 are mounted rotatably to the upper rail 201 via a pin 205 in a state receiving a plate-like locking spring 206. By handling a handle lever 207 against resilient force of the locking spring 206, same as the above described slide rail apparatus 100 of the patent document 1, the relative position between the upper rail 201 and the lower rail 202 can be adjusted and fixed.

As for the slide rail apparatuses, in which locking member and locking mechanism are disposed in an external portion of the respective rails, there is well-known in the art such a slide rail apparatus that an appropriate vertical wall is provided between the side walls of one rail to increase the strength of the cross section of the rail itself (for example, an apparatus disclosed in patent document 3).

A slide rail apparatus 300 shown in FIG. 9, which is set forth in the patent document 3, is different from the above-described apparatuses set forth in the patent document 1 and patent document 2 in the point that the upper rail and the lower rail are structured in reverse. Although, both are different from each other in a point of relative relationship, but the basic structure and function as the slide rail apparatus are the identical to each other. An upper rail 301 and a lower rail 302 are slidably coupled with each other via steel balls 303. A part of the base portion 302a of the lower rail 302 is cut upward to form a reinforcement wall 3A. The reinforcement wall 3A is formed so as to abut on vertical walls 302b formed at both sides of the base portion 302a of the lower rail 302. Owing to the reinforcement wall 3A and the right and left vertical wall 302b, the modulus of section of the lower rail 302, i.e., the slide rail apparatus 300 is increased so that a high strength apparatus is achieved in a reasonable manner.

Patent Document 1
　Japanese Patent Application Laid-Open No. 2002-154355

Patent Document 2
　Japanese Patent Application Laid-Open No. 2001-158259

Patent Document 3
　Japanese Translation of PCT International Application No. S57-55613

DISCLOSURE OF THE INVENTION

Problems to be Solved by the Invention

In the slide rail apparatuses set forth in the patent documents 1 and 2, the locking mechanism can be disposed inside the rail member resulting in a smaller size of the apparatus. Owing to the substantially box-like shape in cross section by coupling the upper rail and the lower rail, the strength can be increased. However, when a seat belt, which is conventionally mounted to a vehicle body, is incorporated into a seat to increase its comfort and user-friendliness, the strength of the slide rail apparatus has to be further increased. Therefore, the substantially box-like shape of the cross section has to be increased, or the thickness of the plate for each rail member has to be increased. Thus, there resides such disadvantage that the size and weight of the apparatus are increased.

Also, the following facts have been verified. That is, at collision or the like of vehicle, a large load acts intensively on the vicinity of the both end portions of the respective rails or the locking mechanism section resulting in a deformation and/or separation in a specific portion. In such a manner that the size of the apparatus or the thickness of the plate for each rail member is simply increased, although the strength of the entire slide rail apparatus is increased, in irrelevant portion also to which the load is not concentrated, the strength is increased. There resides such a disadvantage that designing is short of reasonableness.

In the slide rail apparatus set forth in the patent document 3, a simple constitution achieves the apparatus of high strength. However, the reinforcement wall 3A prevents the locking mechanism from being disposed inside the rail. There resides such a disadvantage that the entire apparatus is hardly reduced in size and weight, and the degree of freedom to combine the seat with other mechanical component parts (for example, a height mechanism for adjusting the seat to raise and lower, a walk-in mechanism for facilitating getting on and off from the rear seat in two-door vehicle) is reduced.

Accordingly, an object of the present invention is to provide a small size and light weight slide rail apparatus which utilizes the advantage of a slide rail apparatus employing a box-like shape of the cross section, and further, by arranging effectively the component parts of the locking mechanism disposed inside the rail, in a specific portion where the load is apt to intensively act; i.e., the strength of the rail in the vicinity of the both end portions thereof is increased reasonably and effectively without increasing the number of the component parts while eliminating the above-described disadvantages.

Means for Solving the Problems

In order to achieve the above objects, an invention set forth in claim 1 is a slide rail apparatus constituted of an upper rail and a lower rail being slidably coupled with each other, which comprises:

one rail having a cross section of a substantially inversed U-like shape formed with a planer base portion and a pair of vertical walls formed at the both sides thereof, and including a pair of flange portions formed by bending the vertical walls outward, the other rail having a cross section of substantially U-like shape formed with a planer base portion and a pair of vertical walls formed at the both sides thereof, and including a pair of flange portions formed by bending the vertical walls inward as well as a pair of right and left grooves between the vertical walls and the flange portions, in which both flange portions of the one rail are slidably fitted with both grooves of the other rail;

by coupling the both rails, a substantially box-like cross section is formed with the respective base portions, the respective vertical walls and the like; and inside the box-like cross section, a locking mechanism having locking members for locking with and unlocking from locking parts and locking teeth on the respective rails is disposed, wherein a constitution such that the locking member includes a mounting portion of a substantially U-like shape in cross section;

the locking member is disposed inside the substantially inversed U-like shape of the one rail;

a substantially box-like cross section is form by coupling the substantially U-like shape cross section of the locking member with the substantially inversed U-like shape cross section of the other rail; and further the periphery thereof is covered with substantially box-like cross section by coupling the rails is employed.

Also, in order to achieve the above object, the invention set forth in claim 2 is, the slide rail apparatus according to claim 1, wherein the locking member is disposed in a forward portion of the one rail;

a locking spring for energizing the locking member in the locking direction and a bracket for mounting the locking spring inside the substantially inversed U-like shape of the one rail are included; and the bracket is disposed in a backward portion of the one rail; and wherein the bracket is constructed of a substantially strip-like plate member having a plate width substantially identical to the distance between the vertical walls of the one rail being bent in a crank shape; and at least a part of the bracket at the both sides in the plate width direction is abutted on the vertical walls of the one rail along the substantially height direction thereof to increase the strength of the cross section in backward portion of the one rail.

Further, in order to achieve the above object, the invention set forth in claim 3 is, the slide rail apparatus according to claim 1 or 2, wherein in one end portion of the locking member, a locking part having a substantially plate-like external frame portion, which is locked by a locking part of the one rail is formed; and in the both sides of the locking part, rocking holes for engaging with locking teeth on the other rail are formed with, and in the center thereof, a reinforcement rib extending in the longitudinal direction of the respective rails and protruding in the direction of the base portion of the one rail is provided, and wherein the joint portion between the mounting portion and the locking part is constructed so that the vertical walls in the mounting portion and the rib of the locking part are partially overlap with each other in the length direction; and right and left notches necessary for forming the side walls are formed at a position displaced in the length direction respectively to increase the rigidity and flexural strength of the joint portion between the mounting portion and the locking part.

Still further, in order to achieve the above object, the invention set forth in claim 4 is, in the invention set forth in claim 1 or 2, the slide rail apparatus as in any of claims 1-3, wherein the locking member is mounted on the one rail via a substantially cylindrical rivet;

the end portion of the rivet is fixed to the base portion of the one rail; and a mounting portion of the locking member is rotatably pivoted to the substantially cylindrical side face of the rivet; wherein the side face of the rivet is abutted on the vertical walls in the mounting portion of the locking member, thereby the substantially box-like cross section formed by coupling the substantially a U-like shape cross section of the locking member with the substantially inversed U-like shape cross section of the one rail is constituted so that the strength thereof is further increased by the rivet.

Effect of the Invention

The invention set forth in claim 1 is such constructed that the locking member is disposed inside the substantially inversed U-like shape of the one rail; the cross section of the substantially U-like shape of the locking member is coupled with the cross section of the substantially inversed U-like shape of the one rail; thereby the substantially box-like cross section is formed; and further, the periphery thereof is covered with the substantially box-like cross section by coupling the both rails. Accordingly, the strength of the slide rail apparatus can be increased without increasing the dimensions of the cross section of substantially box-like shape by coupling the both rails, or the thickness of the plate for the rail members.

The invention set forth in claim 2 is such constructed that the locking member is disposed in the forward portion of the one rail to increase the strength of the forward portion of the rail; the bracket for mounting the locking spring is disposed in the backward portion of the one rail; and at least a part of the both sides of the bracket in the direction of the plate width is abutted on the vertical walls of the one rail along the substantially height direction thereof to increase the strength of the cross section in the backward portion of the one rail, the strength in a specific portion where the load is apt to intensively act; i.e., in the vicinity of end portions of the rail can be increased in a reasonable and effective manner without increasing the number of component parts etc.

The invention set forth in claim 3 is such constructed that, in the joint portion of the mounting portion of the locking member and the locking part, the side walls in the mounting portion and the rib of the locking part are partially overlapped with each other in the length direction, and further, the right and left notches necessary for forming of the side walls are formed in a position displaced in the length direction respectively to increase the rigidity and the flexural strength of the joint portion of the mounting portion and the locking part. Since the shape and the strength of the locking member can be designed easily, reasonable design thereof is possible.

The invention set forth in claim 4 is such constructed that the strength of the substantially box-like cross section, which is formed by coupling the substantially U-like shape cross section of the locking member with the cross section of substantially inversed U-like shape of the one rail is further increased by the rivet. Accordingly, the strength can be increased by effectively using the member of the locking mechanism.

BEST MODE FOR CARRYING OUT THE INVENTION

An embodiment of the present invention will be described with reference to FIGS. 1 to 6. FIG. 1 is a side view showing entire constitution of a seat 1 for vehicle mounted with a slide rail apparatus 10 in accordance with the present invention. The seat 1 for vehicle includes a seat cushion 2 and a seat back 3. A pair of right and left slide rail apparatus 10 is disposed in the lower portion of the seat cushion 2. In FIG. 1, only one of the slide rail apparatus 10 is shown.

A seat cushion 2 is fixed to the upper face of the upper rails 11 of the slide rail apparatus 10 by means of a well-known fastening means such as bolt and nut. Lower rails 12 are fixed to a floor 4 of a vehicle by means of the same fastening means via foots 5, 5 provided at the front and rear ends thereof. Reference numeral 6 denotes a handle lever disposed in a forward lower portion of the seat cushion 2. By operating the slide rail apparatus 10 using the handle lever 6, the seat can be adjusted in a forward/backward position and locked.

Then, referring to FIGS. 2 to 6, the structure of the slide rail apparatus 10 will be described in detail. The upper rail 11 is constituted of a metal plate such as iron formed in substantially inversed U-like shape, of which cross section is formed symmetrically in a manner of press, bending or the like. The upper rail 11 includes a planer base portion 11a, at the both sides of thereof, a pair of right and left vertical walls 11b formed extending downward, and a pair of flange portions 11c, which are bent outer-upward from the lower end of the respective vertical walls 11b and the end-side faces thereof are swollen outward in an L-like shape. Formed in the substantially central portion of the upper rail 11 is a pair of right and left locking portions 11d, in which the vertical walls 11b and the flange portions 11c are integrally cut off.

The lower rail 12 is constituted of a metal plate such as iron, and the cross section thereof is formed in substantially a symmetrical U-like shape by means of press, bending or the like. The lower rail 12 includes a planer base portion 12a, a pair of right and left vertical walls 12b formed at the both sides thereof extending upward, and a pair of flange portions 12d, which are bent inner downward from the upper part 12e of the respective vertical walls 12b. The vertical walls 12b and the flange portions 12d are formed substantially parallel to each other and a groove 12e is formed therebetween respectively. In the front lower end portion of the flange portions 12d at both sides, notches are formed at prescribed distances, thus a plurality of locking teeth 12f are integrally formed.

As shown in FIG. 3 and FIG. 4, the right and left flange portions 11c of the upper rail 11 are engaged with the right and left grooves 12e of the lower rail 12 being interposed by a retainer 14 equipped with steel balls 13a and 13b. One steel ball 13a is rotatably disposed between the upper end outer portion of the flange portion 11e of the upper rail 11 and the corner portion between the vertical wall 12b of the lower rail 12 and the upper end 12c. In the same manner, the other steel ball 13b is rotatably disposed between the lower end outer portion of the flange 11c of the upper rail 11 and the corner portion between the base portion 12a and the vertical wall 12b of the lower rail 12. Owing to the function of the steel balls 13a and 13b, the upper rail 11 is allowed to slide smoothly in the longitudinal direction with respect to the lower rail 12.

Accordingly, the slide rail apparatus 10 has a substantially box-like shape in cross section in its full length, which is formed by the base portion 11a and the pair of right and left vertical walls 11b of the upper rail 11, the base portion 12a and the pair of right and left vertical walls 12b of the lower rail 12 and the flange portions 11c, 12d and the like. Owing to the combination in the box-like cross section, the strength of the slide rail apparatus 10 is increased without increasing thickness of the plate for the upper rail 11 and the lower rail 12.

Reference numeral 15 denotes a locking member constituted of a metal plate such as iron. Principal part of the locking mechanism disposed inside the rail is constructed with a combination of the locking member 15, the locking portions 11d of the upper rail 11 and the locking teeth 12f of the lower rail 12. In one end portion of the locking member 15, a locking part 15a is formed; and in the other end portion thereof, a mounting portion 15b is integrally formed. The locking part 15a has a substantially rectangular plate shape, and in the central portion thereof, a reinforcement rib 15f protruding in the direction of the base portion 11a of the upper rail 11 (upward) and extending in the longitudinal direction of the slide rail apparatus. Further, at the both sides of the rib 15f, a plurality of rocking holes 15c (in this embodiment, three holes) are formed respectively. In the end portion of the mounting portion 15b, the end portion of the handle lever 6 is inserted and fixed via a spring 21 for absorbing dimensional error in mounting and increasing the user-friendliness.

The rib 15f is arranged to protrude in the direction of the base portion 11a (upward). Therefore, even when the locking part 15a is lowered to a position indicated with virtual line in FIG. 4 for carrying out the positional adjustment, the rib 15f does not abut on the base portion 12a of the lower rail 12 so as not be an obstacle for the operation of the locking part 15a (if the rib 15f protrudes to the direction opposite to the base portion 11a (downward), the rib 15f abuts on the base portion 12a of the lower rail 12 and is obstacle for the operation of the locking part 15a).

FIG. 5 is a perspective view showing the locking member 15. Excluding the locking part 15a, substantially full length of the locking member 15 is formed as a mounting portion 15b having a substantially U-like shape in cross section including a planer base portion 15d and vertical walls 15e formed in the both sides thereof. In the right and left vertical walls 15e in the substantially central portion, axle holes 15h are drilled. Also, in the right and left vertical walls 15e of the mounting portion 15b adjacent to a locking part 15a, a pair of projecting pieces 15i protruding to the direction of the base portion 11a (upward) are integrally formed.

The mounting portion 15b having substantially U-like shape in cross section, which includes the base portion 15d and the vertical walls 15e formed in the both sides thereof is prescribed to dimensions which allow the mounting portion 15b to fit with the inside having a the substantially inversed U-like shape, which is formed by the base portion 11a of the upper rail 11 and the right and left vertical walls 11b, being faced to each other including a slight clearance. Owing to this, in the state that the slide rail apparatus 10 is assembled, a portion where vertical walls 15e of the locking member 15 exist; i.e., the portion vicinity to the front end of the slide rail apparatus 10 is formed in a substantially box-like shape in cross section as shown in FIG. 3 by the base portion 11a and the right and left vertical walls 11b of the upper rail 11 and the base portion 15d and the right and left vertical walls 15e of the mounting portion 15. And further, outer side of the above, a substantially box-like shape in cross section same as that of the conventional is formed by the upper rail 11 and the lower rail 12. Accordingly, owing to the above-described combination and constitution, in the portion vicinity to the front end of the slide rail apparatus 10, a substantially box-like double-layered shape in cross section is formed. Thus, the modulus of section is largely increased resulting in an increased strength.

The cross width in the joint portion Y shown in FIG. 5 has to be formed narrow in width so as to be received between the right and left vertical walls 11b of the upper rail 11. However, due to the relationship between the projecting direction of the rib 15f formed in the locking part 15a and the direction where the vertical wall 15e of the mounting portion 15b is formed, the locking member 15 has such a shape that the bend direction of the press is changed in the joint portion Y leading to a reduction of strength. Therefore, the end portion of the rib 15f is arranged so as to partially overlap with a portion where the vertical walls 15e of the mounting portion 15b are formed; and cuts 150a, 150b, which are necessary for forming the right and left vertical walls 15e, are formed in a position displaced in the longitudinal direction of the locking member 15 respectively. Accordingly, owing to the partial overlap of the rib 15f, and the vertical walls 15e of the mounting portion 15b, the rigidity is increased. Also, since the cuts 150a, 150b where load is apt to concentrate, are displaced in the longitudinal direction, the strength in the bending direction is prevented from being reduced, and irrespective of the narrow cross width, satisfactory strength for the joint portion Y is ensured.

Reference numeral 17 denotes a rivet of which side faces are cut off and a through hole 17a is formed in the central portion thereof, the rivet 17 is disposed inside the U-like shape cross section of the mounting portion 15b formed in the locking member 15. The locking member 15 is mounted on the rivet 17 rotatably on the axle pin 18 as a fulcrum by means of an axle pin 18, which goes through the axle hole 15h and the through hole 17a. Further, the end portion of the rivet 17 is caulked and fixed to a caulking hole 110a drilled in the base portion 11a of the upper rail 11. As shown in FIG. 3, the width of the side faces of the rivet 17 is prescribed so as to be substantially identical to the distance between the right and left vertical walls 11b formed in the upper rail 11; thus, it is arranged so that the rivet 17 also increases the strength of the cross section of the upper rail 11; i.e., the strength of the slide rail apparatus 10.

Reference numeral 16 denotes a locking spring of a bent metal rod, which is integrally formed of straight portions 16a dispose substantially parallel to each other and a bent portion 16b, which is bent protruding to the direction of the base portion 11a of the upper rail 11 (upward). The locking spring 16 is fixed to the base portion 11a of the upper rail 11 in a substantially central portion along with bracket 20 formed of a plate member bent in a crank shape and a rivet 19. The front end portions of the straight portions of the locking spring 16 are latched by a concave portion 15g, which is the rear face of the rib 15f of the locking member 15, and the bent portion 16b is arranged so as to resiliently abut on the inner surface of the base portion 11a of the upper rail 11. The locking part 15a of the locking member 15 is arranged so that the locking spring 16 constantly energizes the locking part 15a in the direction to engage with locking portions 11d of the upper rail 11.

Here, the width of the plate of a base 20a of the bracket 20 is prescribed so as to be substantially identical to that of the inner side face of the substantially inversed U-like shape formed by the base portion 11a of the upper rail 11 and the right and left vertical walls 11b. Therefore, in the state where the slide rail apparatus 10 is assembled, as shown in FIG. 6, the right and left vertical walls 11b of the upper rail 11 abut on the base 20a, thereby serving as a reinforcement wall. Thus, the strength is increased. That is, the strength of the backward portion of the slide rail apparatus 10 fixed with the bracket 20 is reasonably increased without adding any another members.

A pair of projecting pieces 15i provided to the locking member 15 is for incorporating with a walk-in mechanism, which is not employed in this embodiment. The projecting pieces 15i are arranged so as to protrude upward through a pair of through holes 11e formed in the base portion 11a of the upper rail 11. The locking member 15 is arranged so as to operate via the projecting pieces 15i by a member of a walk-in mechanism (not shown) without using the handle lever 6.

In the state where the handle lever 6 is not handled, the locking part 15a of the locking member 15 is being energized in the direction of the base portion 11a of the upper rail 11 (upward) by the locking spring 16, the external frame portion of the locking part 15a is locked with the locking portions 11d of the upper rail 11, and the rocking holes 15c of the locking part 15a are locked by appropriate locking teeth 12f of the lower rail 12, thereby the relative position between the upper rail 11 and the lower rail 12 is fixed. That is, in such state, the slide rail apparatus 10 is locked, thus the forward/backward position of the seat maintained constantly.

When the handle lever 6 is handled in the direction indicated with an arrow Z in FIG. 2, from the above-described state, the locking member 15 is rotated on the axle pin 18 as the fulcrum. Then, the locking part 15a of the locking member 15 is moved from a position indicated with a solid line to a position indicated with a virtual line shown in FIG. 4; the lock between the locking part 15a and the locking portions 11d of the upper rail 11 is released; and simultaneously, the lock between the rocking holes 15C of the locking part 15a and the locking teeth 12f of the lower rail 12 is also released; the relative position between the upper rail 11 and the lower rail 12 becomes adjustable. That is, when the lock of the slide rail apparatus 10 is released, the forward/backward position of the seat becomes adjustable. Also, in the above-described state, after the forward/backward position of the seat is appropriately adjusted, when handling of the handle lever 6 is released, owing to the resilient force of the locking spring 16, the locking member 15 is rotated in the reversed direction on the axle pin 18 as the fulcrum, thus the slide rail apparatus 10 restores to the locked initial state.

EXPLANATION OF REFERENCE NUMERALS

Figure 1:
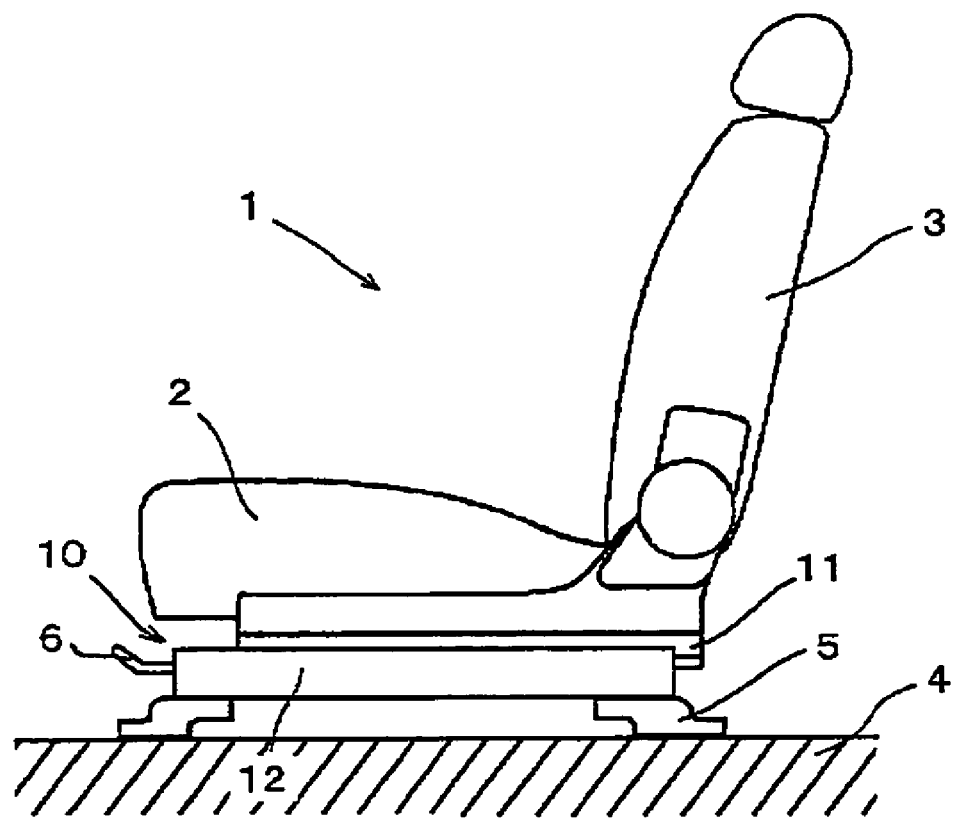
FIG. 1 is a side view showing an entire constitution of a seat for vehicle mounted with a slide rail apparatus in accordance with the present invention.
Figure 2:
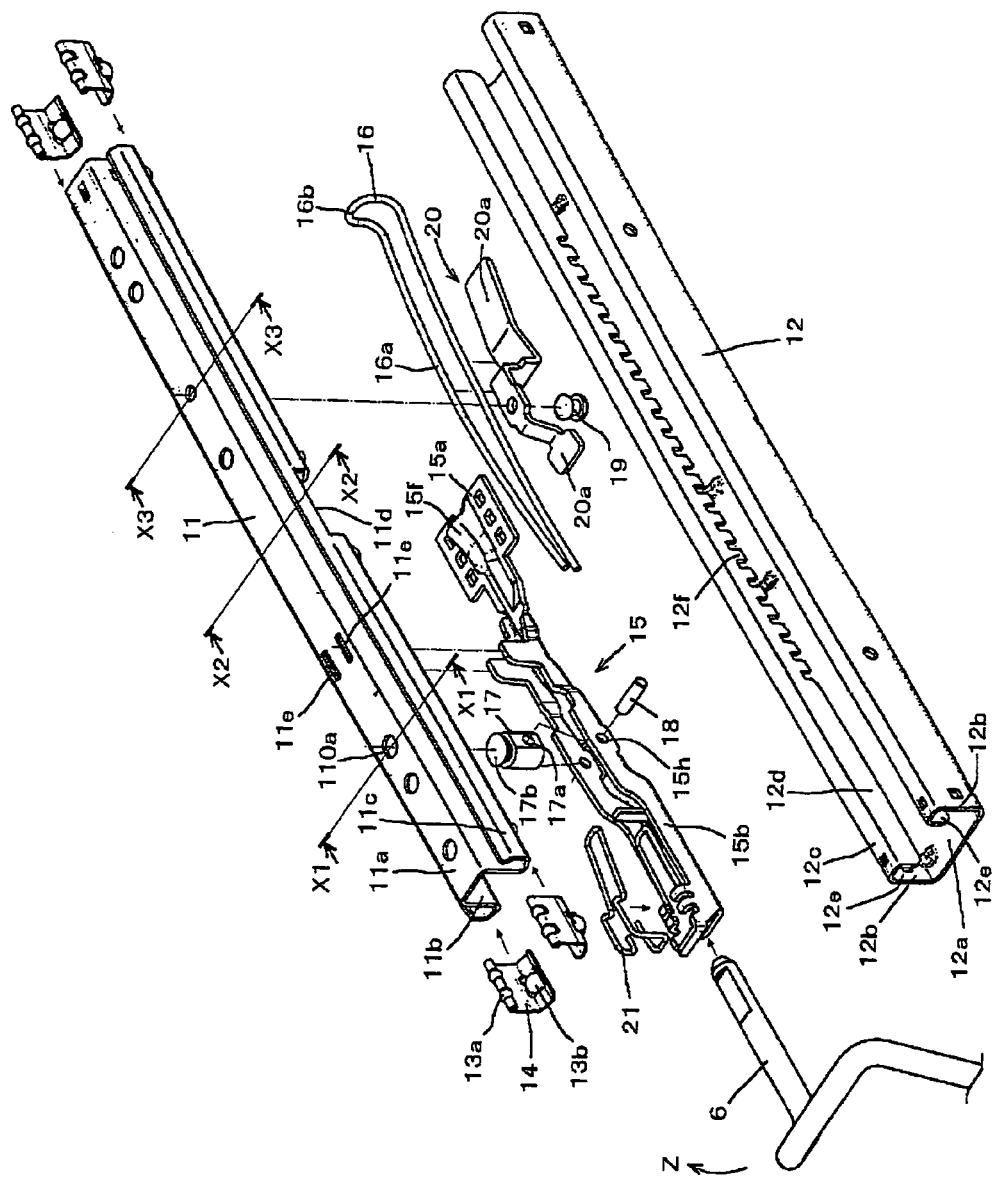
FIG. 2 is an exploded perspective view showing an embodiment of the slide rail apparatus in accordance with the present invention.
Figure 3:
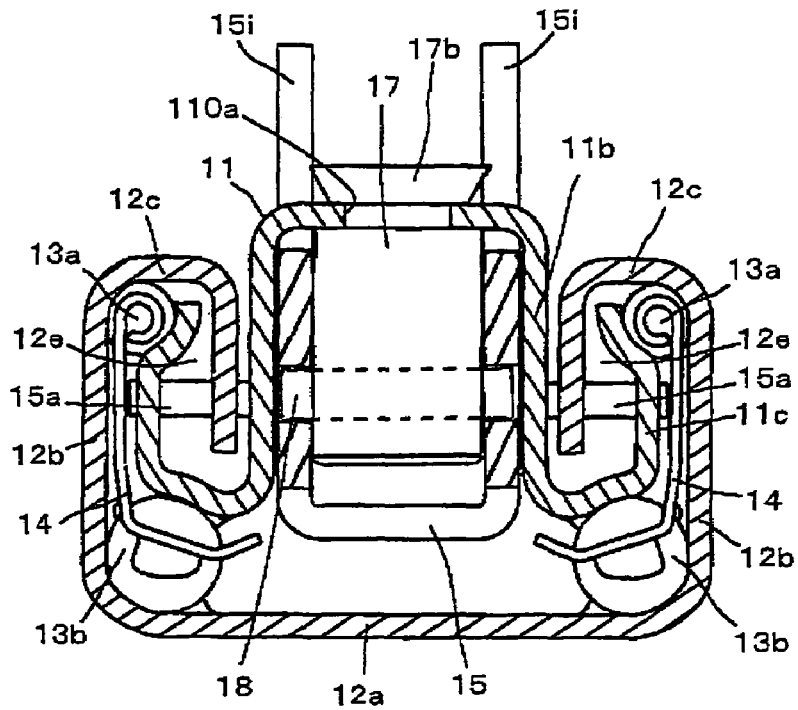
FIG. 3 is a cross sectional view taken along the line X1-X1 in FIG. 2.
Figure 4:
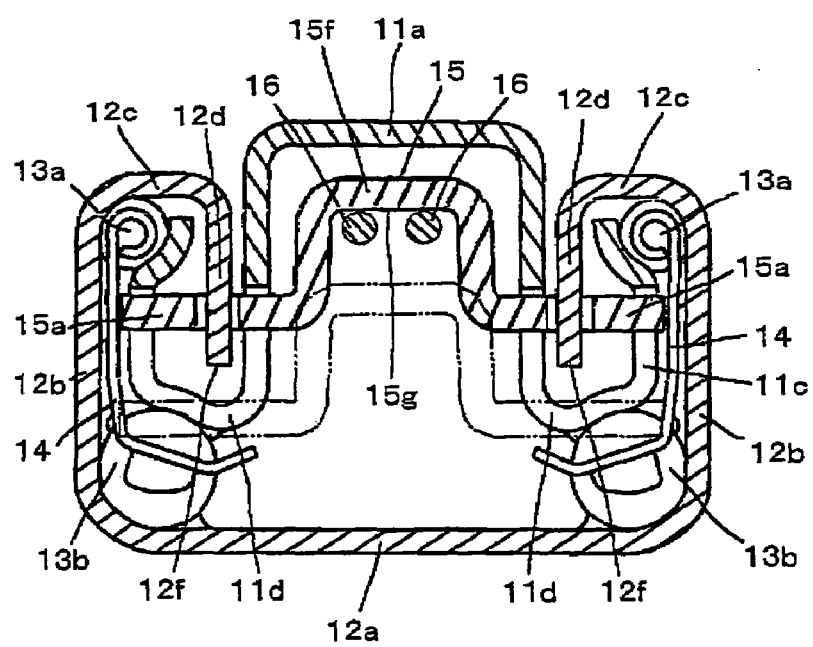
FIG. 4 is a cross sectional view taken along the line X2-X2 in FIG. 2.
Figure 5:
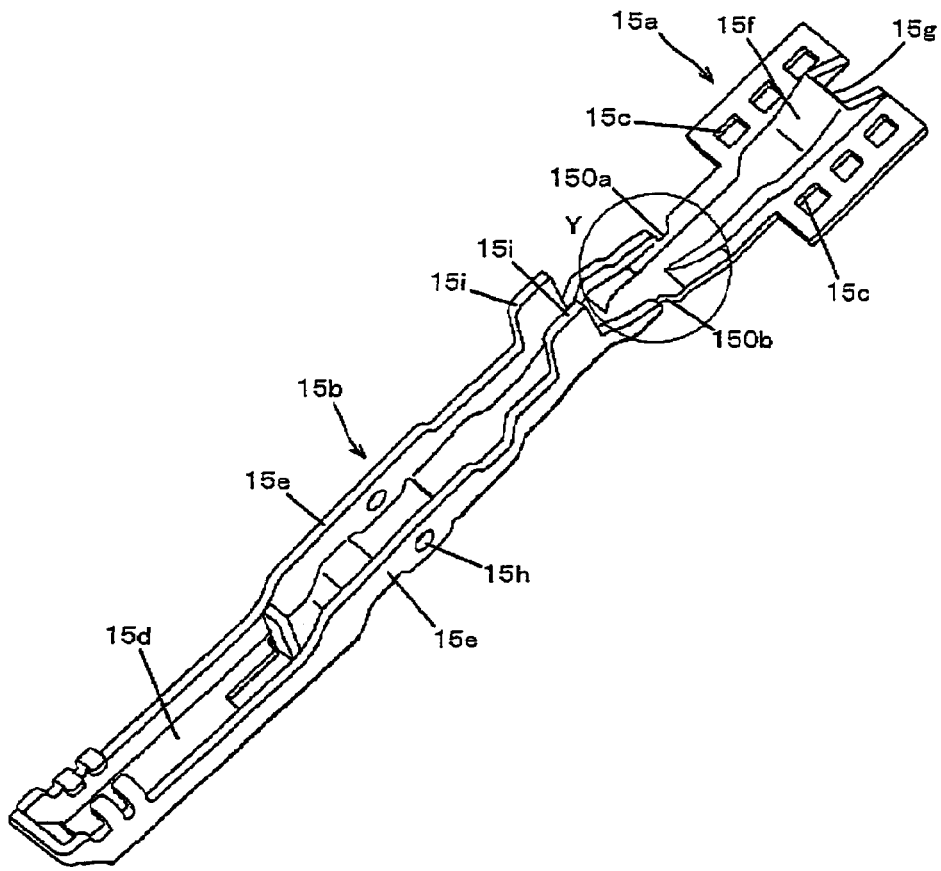
FIG. 5 is a perspective view showing a detailed structure of a locking member 15.
Figure 6:
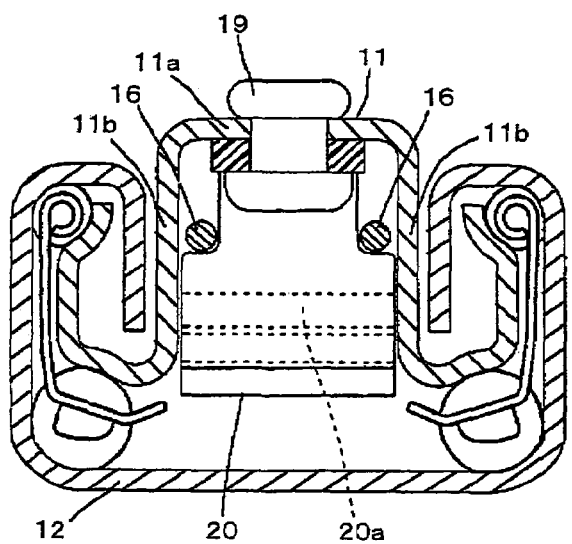
FIG. 6 is a cross sectional view taken along the line X3-X3 in FIG. 2.
Figure 7:
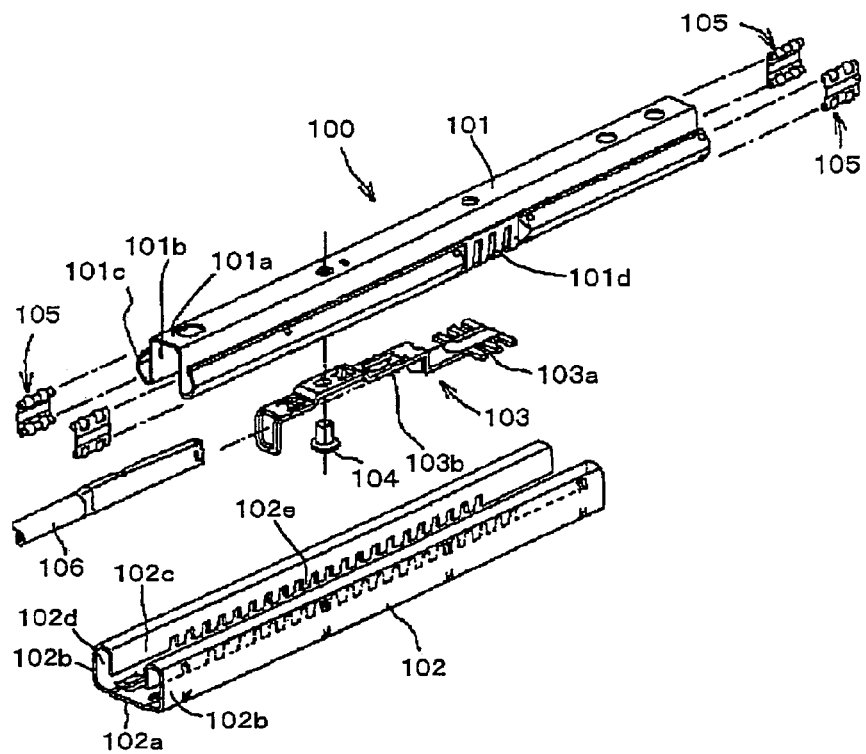
FIG. 7 is an exploded perspective view showing a conventional slide rail apparatus set forth in the patent document 1.
Figure 8:
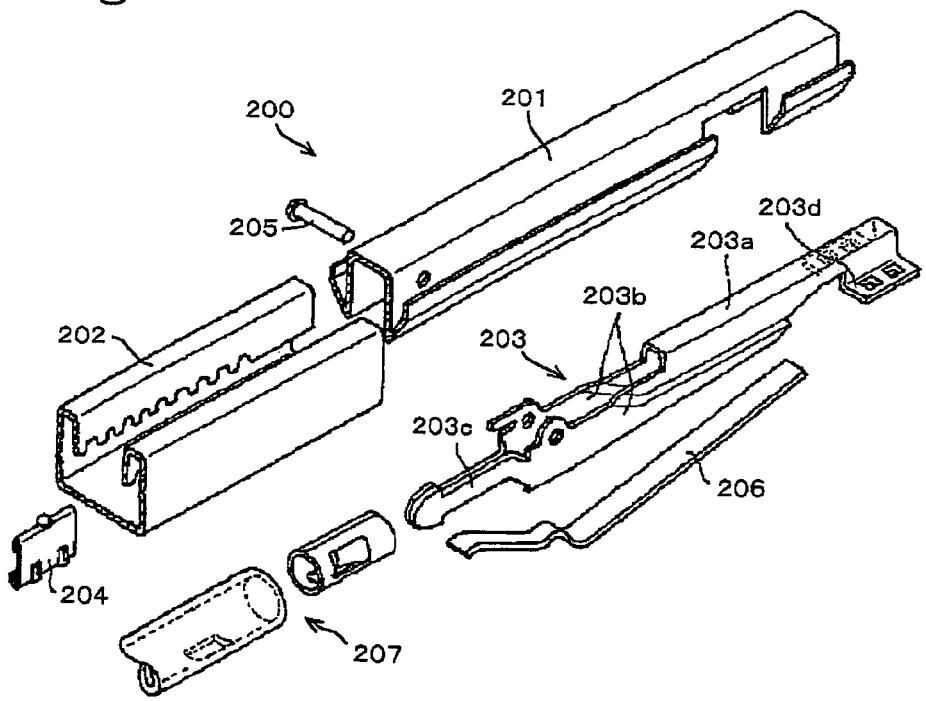
FIG. 8 is an exploded perspective view showing a conventional slide rail apparatus set forth in the patent document 2.
Figure 9:
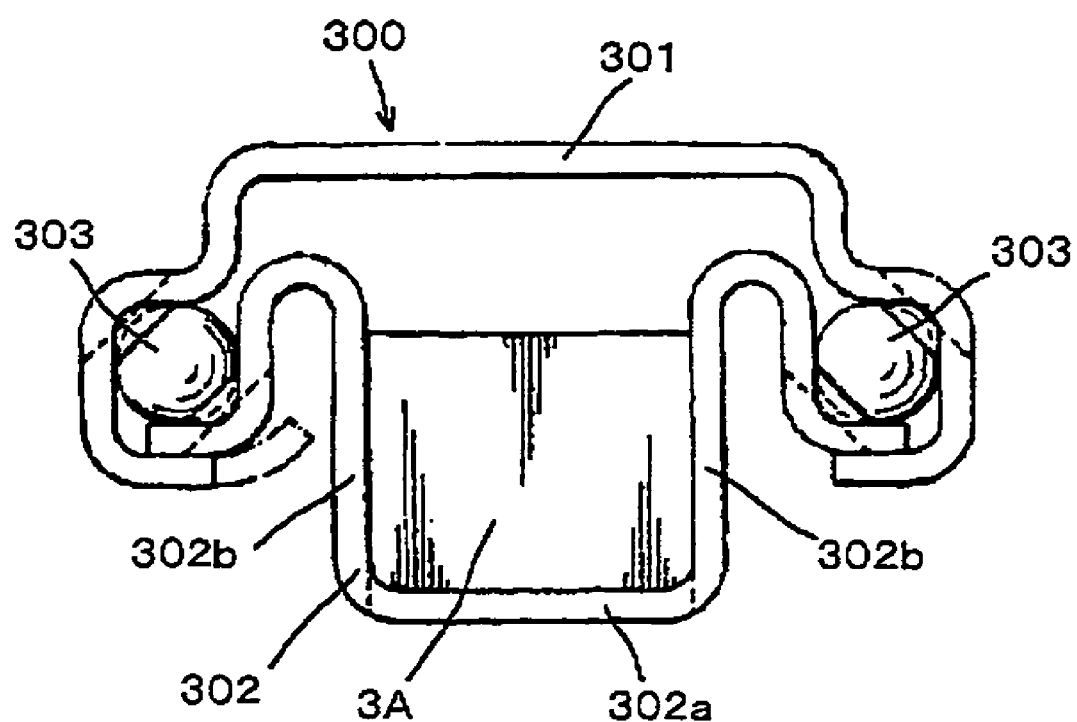
FIG. 9 is an exploded perspective view showing a conventional slide rail apparatus set forth in the patent document 3.

10 Slide rail apparatus
11 Upper rail
12 Lower rail
14 Retainer
15 Locking member

The invention claimed is:

1. A slide rail apparatus constituted of an upper rail and a lower rail being slidably coupled with each other, comprising:
  a first rail having a cross section of a substantially inversed U-like shape formed with a planar base portion and a pair of vertical walls formed at both sides thereof, and including a first pair of flange portions formed by bending the vertical walls outward,
  a second rail having a substantially U-shaped cross section formed with a planar base portion and a pair of vertical walls formed at both sides thereof, and including a second pair of flange portions formed by bending the vertical walls inward as well as a pair of right and left grooves between the vertical walls and the flange portions,
  both flange portions of the first rail are slidably fitted with both grooves of the second rail;
  by coupling the both the first and the second rails, a first substantially box-like cross section is formed with the respective base portions and vertical walls; and
  a locking mechanism having a locking member for locking with and unlocking from a locking portion provided on the first pair of flanges and a plurality of locking teeth provided on the second pair of flanges is disposed inside the first box-like cross section, and the locking member includes a mounting portion having a substantially U-shaped cross section and is disposed inside the substantially inversed U-like shape of the first rail; and
  a second substantially box-like cross section is formed by coupling the locking member with the second rail.

2. A slide rail apparatus constituted of an upper rail and a lower rail being slidably coupled with each other, comprising:
  a first rail having a cross section of a substantially inversed U-like shape formed with a planar base portion and a pair of vertical walls formed at both sides thereof, and including a first pair of flange portions formed by bending the vertical walls outward,
  a second rail having a substantially U-shaped cross section formed with a planar base portion and a pair of vertical walls formed at both sides thereof, and including a second pair of flange portions formed by bending the vertical walls inward as well as a pair of right and left grooves between the vertical walls and the flange portions, in which
  both flange portions of the first rail are slidably fitted with both grooves of the second rail;
  by coupling both the first and the second rails, a first substantially box-like cross section is formed by the respective base portions and vertical walls; and
  a locking mechanism having a locking member for locking with, and unlocking from, a locking portion formed in the first rail and a plurality of locking teeth disposed on the second rail is positioned inside the box-like cross section, and the locking member includes a mounting portion having a substantially U-shaped cross-section and is disposed inside the substantially inversed U-shaped cross-section of the first rail;

a second substantially box-like cross section is formed by coupling the locking member with the second rail and;

wherein the locking member is disposed in a forward portion of the first rail;

a locking spring for energizing the locking member in a locking direction and a bracket for mounting the locking spring inside the first rail are included; and the bracket is disposed in a backward portion of the first rail; and wherein the bracket is constructed of a substantially strip-like plate member having a plate width substantially identical to the distance between the vertical walls of the first rail being bent in a crank shape; and at least a part of the bracket is abutted on the vertical walls of the first rail to increase the strength of the cross section in the backward portion of the first rail.

3. A slide rail apparatus constituted of an upper rail and a lower rail being slidably coupled with each other, comprising:

a first rail having a cross section of a substantially inversed U-like shape formed with a planar base portion and a pair of vertical walls formed at both sides thereof, and including a first pair of flange portions formed by bending the vertical walls outward, a second rail having a substantially U-shaped cross section formed with a planar base portion and a pair of vertical walls formed at both sides thereof, and including a second pair of flange portions formed by bending the vertical walls inward as well as a pair of right and left grooves between the vertical walls and the flange portions, in which both flange portions of the first rail are slidably fitted with both grooves of the second rail;

by coupling both the first and the second rails, a first substantially box-like cross section is formed by the respective base portions and vertical walls; and a locking mechanism having a locking member for locking with, and unlocking from, a locking portion formed in the first rail and a plurality of locking teeth disposed on the second rail is positioned inside the box-like cross section, and the locking member includes a mounting portion having a substantially U-shaped cross-section and is disposed inside the substantially inversed U-shaped cross-section of the first rail;

a second substantially box-like cross section is formed by coupling the locking member with the second rail and;

wherein, in one end portion of the locking member, a locking part having a substantially plate-like external frame portion, which is engageable with the locking portion of the first rail, is formed; and rocking holes for engaging with the plurality of locking teeth on the second rail are formed in the locking part and a reinforcement rib extending in the longitudinal direction of the respective rails and protruding in the direction of the base portion of the first rail is provided, and wherein a joint portion between the mounting portion and the locking part is constructed so that the vertical walls in the mounting portion and the rib of the locking part partially overlap with each other in the length direction; and right and left notches necessary for forming the side walls are formed at a position displaced in the length direction respectively to increase the rigidity and strength of the joint portion between the mounting portion and the locking part.

4. The slide rail apparatus according to claim 1 wherein the locking member is mounted on the first rail via a substantially cylindrical rivet having a side face formed thereon;

the end portion of the rivet is fixed to the base portion of the first rail; and a mounting portion of the locking member is pivotally attached to the rivet; wherein the side face of the rivet is abutted on the vertical walls in the mounting portion of the locking member.

5. A slide rail apparatus having an upper rail and a lower rail being slidably coupled with each other, comprising:

a generally u-shaped upper first rail having a generally planar first base and a first pair of walls extending from one side of the first base such that the first base and the first pair of walls define a first channel;

a first pair of flanges formed on the first pair of walls and extending away from the first channel and each flange of the first pair of flanges having a locking portion formed thereon and defining a groove that is open in the direction of the first base;

a generally u-shaped lower second rail having a generally planar second base and a second pair of walls extending from one side of the second base such that the second base and the second pair of walls define a second channel;

a second pair of flanges formed on the second pair of walls and extending toward the second channel and each flange of the second pair of flanges having a plurality of locking teeth formed thereon and defining a groove that is open in the direction of the second base;

wherein the first flanges and the second flanges are slidingly fitted together such that the first channel and the second channel define a first assembly having a box-like cross section;

a locking mechanism is disposed within the first channel and includes a locking member for locking with and unlocking from the locking portion of the first flange and the plurality of locking teeth of the second flange, wherein the locking member includes a mounting portion having a base portion and a third pair of walls extending from the base portion that define a second assembly having a box-like cross section in conjunction with the second rail.

6. The slide rail apparatus according to claim 5, wherein the locking member is mounted on the first rail within the first channel via a substantially cylindrical rivet having a side face formed thereon;

the end portion of the rivet is fixed to the base portion of the first rail; and a mounting portion of the locking member is pivotally attached to the rivet; wherein the side face of the rivet is abutted on the third pair of walls in the mounting portion of the locking member, thereby strengthening the second assembly.

* * * * *